US011909546B2

(12) United States Patent
Liu

(10) Patent No.: US 11,909,546 B2
(45) Date of Patent: Feb. 20, 2024

(54) METHOD AND NETWORK NODE FOR SENDING AND OBTAINING ASSERT PACKET

(71) Applicant: HUAWEI TECHNOLOGIES CO., LTD., Guangdong (CN)

(72) Inventor: Yisong Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 17/382,596

(22) Filed: Jul. 22, 2021

(65) Prior Publication Data

US 2021/0351947 A1 Nov. 11, 2021

Related U.S. Application Data

(63) Continuation of application No. PCT/CN2020/075199, filed on Feb. 14, 2020.

(30) Foreign Application Priority Data

Feb. 21, 2019 (CN) .......................... 201910128323.1

(51) Int. Cl.
*H04L 12/753* (2013.01)
*H04L 12/721* (2013.01)
(Continued)

(52) U.S. Cl.
CPC ...... *H04L 12/1881* (2013.01); *H04L 12/1886* (2013.01); *H04L 45/124* (2013.01);
(Continued)

(58) Field of Classification Search
CPC ............. H04L 12/1881; H04L 12/1886; H04L 45/124; H04L 45/16; H04L 45/48;
(Continued)

(56) References Cited

U.S. PATENT DOCUMENTS 7,746,858 B2 * 6/2010 Boers ..................... H04L 45/04
370/312
9,031,069 B2 * 5/2015 Liu ......................... H04L 45/16
370/390
(Continued)

FOREIGN PATENT DOCUMENTS

CN 101051920 A 10/2007
CN 101420362 A 4/2009
(Continued)

OTHER PUBLICATIONS

Yisong Liu et al, PIM Assert Message Packing draft-liu-pim-assert-packing-00, PIM Working Group Internet Draft, Mar. 6, 2019, total 11 pages. XP015131465.
(Continued)

*Primary Examiner* — Abdullahi E Salad
(74) *Attorney, Agent, or Firm* — HUAWEI TECHNOLOGIES CO., LTD.

(57) ABSTRACT

This application provides a method and device for sending and obtaining an assert message, to increase packet processing efficiency and reduce overheads of the network device. The method includes: determining, by a network node, a plurality of assert records based on one multicast source address, where each of the plurality of assert records includes the multicast source address and one multicast group address, the plurality of assert records have the same multicast source address, and multicast group addresses included in different assert records in the plurality of assert records are different from each other; generating, by the network node, one assert message based on the plurality of assert records, where the assert message includes the multicast source address and the multicast group addresses in the plurality of assert records; and sending, by the network node, the assert message in a multicast mode.

16 Claims, 8 Drawing Sheets

(51) Int. Cl.
*H04L 12/741* (2013.01)
*H04L 12/18* (2006.01)
*H04L 45/12* (2022.01)
*H04L 45/16* (2022.01)
*H04L 45/48* (2022.01)
*H04L 45/74* (2022.01)

(52) U.S. Cl.
CPC .............. *H04L 45/16* (2013.01); *H04L 45/48* (2013.01); *H04L 45/74* (2013.01)

(58) Field of Classification Search
CPC ....... H04L 45/74; H04L 12/185; H04L 12/18; H04L 45/66; H04L 47/806
See application file for complete search history.

(56) References Cited

U.S. PATENT DOCUMENTS

| | | | | |
|---|---|---|---|---|
| 9,160,553 | B2* | 10/2015 | Wu | H04L 61/5069 |
| 9,356,789 | B1* | 5/2016 | Peter | H04L 65/611 |
| 10,715,465 | B1* | 7/2020 | Ewing | G08B 21/245 |
| 2007/0153790 | A1* | 7/2007 | Boers | H04L 45/04 370/351 |
| 2009/0296709 | A1* | 12/2009 | Duan | H04L 45/02 370/390 |
| 2012/0218898 | A1* | 8/2012 | Cai | H04L 45/125 370/237 |
| 2013/0121336 | A1* | 5/2013 | Hemige | H04L 45/16 370/390 |
| 2018/0367451 | A1* | 12/2018 | Gulrajani | H04L 45/54 |

FOREIGN PATENT DOCUMENTS

| | | |
|---|---|---|
| CN | 101635671 A | 1/2010 |
| CN | 101789900 A | 7/2010 |
| CN | 101989952 A | 3/2011 |
| CN | 102158415 A | 8/2011 |
| CN | 106302176 A | 1/2017 |
| CN | 106878188 A | 6/2017 |
| CN | 109218207 A | 1/2019 |

OTHER PUBLICATIONS

Request for Comments: 7761, B. Fenner et al, Protocol Independent Multicast—Sparse Mode (PIM-SM):Protocol Specification (Revised), Internet Engineering Task Force (IETF), Mar. 2016, total 137 pages.

* cited by examiner

METHOD AND NETWORK NODE FOR SENDING AND OBTAINING ASSERT PACKET

CROSS-REFERENCE TO RELATED APPLICATIONS

This application is a continuation of International Application No. PCT/CN2020/075199, filed on Feb. 14, 2020, which claims priority to Chinese Patent Application No. 201910128323.1, filed on Feb. 21, 2019. The disclosures of the aforementioned applications are hereby incorporated by reference in their entireties.

TECHNICAL FIELD

Embodiments of this application relate to the field of communications technologies, and in particular, to a method and device for sending an assert packet.

BACKGROUND

A multicast packet reaches a receiver (a multicast group member) from a multicast source and is replicated and forwarded over a multicast network. To set up the multicast network, a multicast protocol needs to be configured. For example, currently, a protocol independent multicast (PIM) protocol is a most widely used intra-domain multicast protocol. A multicast distribution tree built by using the PIM protocol may be used to guide multicast packet forwarding. The PIM protocol may be used to implement functions of creating a multicast route on demand, dynamically responding to a network topology change, and performing forwarding based on a routing entry.

Devices 101 to 105 shown in FIG. 1 run the PIM protocol. The device 102 sends a multicast packet obtained from the device 101 to the downstream device 104. The device 103 sends the same multicast packet obtained from the device 101 to the downstream device 105 of the device 103. In the foregoing process of forwarding the multicast packet, because a device 106 is a Layer 2 switching device in a shared network, for example, in a shared local area network (LAN), the device 106 transparently transmits the multicast packet sent by the device 102 to the downstream device 104 to the devices 103 and 105 connected to the device 106. In this way, the device 103 that forwards the multicast packet further receives the multicast packet from an outbound interface of the device 103, so that the device 103 finds that there is another device that forwards the same multicast packet in the same LAN. This triggers the device 103 to send an assert packet in a multicast mode. After receiving the assert message sent by the device 103, the device 102 selects a winner according to an assert election rule to forward the multicast packet, to ensure that one multicast packet is transmitted in the same LAN.

However, with wide deployment of multicast services, the number of multicast entries increases exponentially. A device in the multicast network probably sends a large number of assert messages in a short time. This increases network overheads and causes great impact on a device in a shared network. In addition, the assert messages may be discarded because the device cannot process the assert messages in time. This affects normal forwarding of the multicast packet.

SUMMARY

Embodiments of this application provide a method and device for sending and obtaining an assert message, to increase packet processing efficiency and reduce overheads of the network device.

According to a first aspect, this application provides a method for sending an assert message. The method includes: A network node determines a plurality of assert records based on one multicast source address. Each of the plurality of assert records includes the multicast source address and one multicast group address. The plurality of assert records have the same multicast source address, and multicast group addresses of different assert records in the plurality of assert records are different from each other. The network node generates one assert message based on the plurality of assert records, where the assert message includes the multicast source address and the multicast group addresses in the plurality of assert records. The network node sends the assert message in a multicast mode.

According to the foregoing method, the network node generates the assert message based on the plurality of assert records, and sends the assert message to another network node in the multicast mode. This can increase efficiency of sending the assert message, especially in a scenario in which a large number of assert messages are triggered for sending. In addition, according to the foregoing method, processing overheads of the device can be reduced, to shorten a time at which multicast traffic is repeatedly sent.

In a possible design, that a network node determines a plurality of assert records based on one multicast source address includes: The network node determines a first assert record set based on the multicast source address, where the first assert record set includes a first assert record and a second assert record that have the same multicast source address.

According to the foregoing method, the plurality of assert records are determined based on the same multicast source address, and the assert message is generated based on the plurality of assert records. This further increases the efficiency of sending the assert message.

In a possible design, that the network node generates one assert message based on the plurality of assert records includes: The network node extracts the multicast source address, and combines the multicast source address with a multicast group address of the first assert record and a multicast group address of the second assert record to generate the assert message.

According to the foregoing method, the network node may extract the same multicast source address from the plurality of assert records, to increase utilization of the assert message and the efficiency of sending the assert message.

In a possible design, before the network node sends the assert packet, the method further includes: The network node receives a Hello packet sent by another network node in a multicast network, where the Hello packet carries a first identifier, and the first identifier is used to indicate that the another network node in the multicast network supports a function of receiving the assert message.

According to the foregoing method, the network node may determine, based on the identifier carried in the Hello packet, whether the device that sends the Hello packet has a function of processing the assert message.

In a possible design, the assert message carries the number of multicast group addresses.

According to the foregoing method, the network node may carry the number of multicast group addresses included in the assert message in the assert message.

According to a second aspect, this application provides another method for sending an assert packet. The method includes: A network node determines a first assert record set based on one rendezvous point RP address. The first assert record set includes a plurality of assert records, where each assert record includes one multicast source address and one multicast group address. Each of different assert records in the plurality of assert records include a first multicast group address. The network node generates one assert message, where the assert message carries the RP address, the first multicast group address, and a plurality of multicast source addresses. The network node sends the assert message in a multicast mode.

According to the foregoing method, the network node generates the assert message based on the plurality of assert records and the RP address, and sends the assert message to another network node in the multicast mode. This can increase efficiency of sending the assert message, especially in a scenario in which a large number of assert messages are triggered for sending. In addition, according to the foregoing method, processing overheads of the device can be reduced, to shorten a time at which multicast traffic is repeatedly sent.

In a possible design, the method further includes: The network node determines a second assert record set based on the RP address, where the second assert record set includes a plurality of assert records. Each assert record in the second assert record set includes one multicast source address and one multicast group address. Each of different assert records in the plurality of assert records in the second assert record set includes a second multicast group address. The assert message further includes the second multicast group address, and the first multicast group address is different from the second multicast group address.

According to the foregoing method, the assert message includes a plurality of different multicast group addresses. This increases utilization of the assert message and the efficiency of sending the assert message.

In a possible design, that the network node generates one assert message includes: The network node extracts the RP address and the multicast group addresses of the first assert record set and the second assert record set, and combines the RP address and the multicast group addresses of the first assert record set and the second assert record set with the multicast source addresses of the first assert record set and the second assert record set to generate the assert message.

According to the foregoing method, the network node may extract the same RP address, to increase the utilization of the assert message and the efficiency of sending the assert message.

In a possible design, before the network node sends the assert packet, the method further includes: The network node receives a Hello packet sent by another network node in a multicast network, where the Hello packet carries a first identifier, and the first identifier is used to indicate that the another network node in the multicast network supports a function of receiving the assert message.

In a possible design, the assert message carries the number of multicast group addresses and the number of multicast source addresses.

According to a third aspect, this application provides a method for obtaining an assert message in a multicast network. The method includes: A network node receives the assert message, where the assert message includes one multicast source address and a plurality of multicast group addresses. The network node obtains a plurality of assert records by parsing the assert message, where each of the plurality of assert records includes the multicast source address and one of the plurality of multicast group addresses, and the multicast group addresses in the plurality of assert records are different from each other.

In a possible design, that the network node obtains a plurality of assert records by parsing the assert message includes: The network node combines the multicast source address and the plurality of multicast group addresses that are carried in the assert message to obtain the plurality of assert records.

According to a fourth aspect, this application provides a method for obtaining an assert message in a multicast network. The method includes: A network node receives the assert message, where the assert message includes a rendezvous point RP address and a first assert record set, and the first assert record set includes a first multicast group address and a plurality of multicast source addresses. The network node obtains a plurality of assert records by parsing the first assert record set, where each of the plurality of assert records includes one multicast source address and one multicast group address, and each of different assert records in the plurality of assert records includes a first multicast group address.

In a possible design, the assert message further includes a second assert record set. The method further includes: The network node obtains a plurality of assert records by parsing the second assert record set, where each of different assert records in the second assert record set includes a second multicast group address. The first multicast group address is different from the second multicast group address.

According to a fifth aspect, an embodiment of this application provides a network node for sending an assert message, to perform the method in any one of the first aspect or the possible implementations of the first aspect. Specifically, the network node includes units configured to perform the method in any one of the first aspect or the possible implementations of the first aspect.

According to a sixth aspect, an embodiment of this application provides another network node for sending an assert message, to perform the method in any one of the second aspect or the possible implementations of the second aspect. Specifically, the network node includes units configured to perform the method in any one of the second aspect or the possible implementations of the second aspect.

According to a seventh aspect, an embodiment of this application provides a network node for obtaining an assert message, to perform the method in any one of the third aspect or the possible implementations of the third aspect. Specifically, the network node includes units configured to perform the method in any one of the third aspect or the possible implementations of the third aspect.

According to an eighth aspect, an embodiment of this application provides a network node for obtaining an assert message, to perform the method in any one of the fourth aspect or the possible implementations of the fourth aspect. Specifically, the network node includes units configured to perform the method in any one of the fourth aspect or the possible implementations of the fourth aspect.

According to a ninth aspect, a network device for sending or obtaining an assert message is provided. The device includes a processor, a transceiver, and a memory. The functional modules in the fifth aspect, the sixth aspect, the seventh aspect, and the eighth aspect may be implemented by hardware, or may be implemented by hardware executing corresponding software. The hardware or software includes one or more modules corresponding to the functions. For example, the transceiver is configured to complete functions of a receiving unit and a sending unit, the processor is configured to complete functions of a determining unit, a generation unit, and an obtaining unit, and the memory is configured to store a program instruction processed by the processor to implement the methods in the embodiments of this application. The processor, the transceiver, and the memory are connected through a bus and implement mutual communication.

According to a tenth aspect, a system for sending and obtaining an assert message is provided. The system includes the network device provided in the first aspect and the second aspect, and referred to as a first network device, and the network device provided in the third aspect and the fourth aspect and is referred to as a second network device. The first network device is configured to determine a plurality of assert records based on one multicast source address or RP address, generate one assert message, and sent the assert message in a multicast mode. The second network device is configured to receive the assert message sent by the first network node and obtain the plurality of assert records by parsing the assert message.

According to an eleventh aspect, this application provides a computer-readable storage medium, configured to store a computer software instruction used by the foregoing network node. The computer-readable storage medium includes a program designed to execute the foregoing aspects.

DESCRIPTION OF EMBODIMENTS

The following describes the embodiments of the present disclosure with reference to accompanying drawings.

A network node in the embodiments of the present disclosure may be a network device, for example, a router, a switch, or a forwarder in software-defined networking (SDN).

Figure 1:
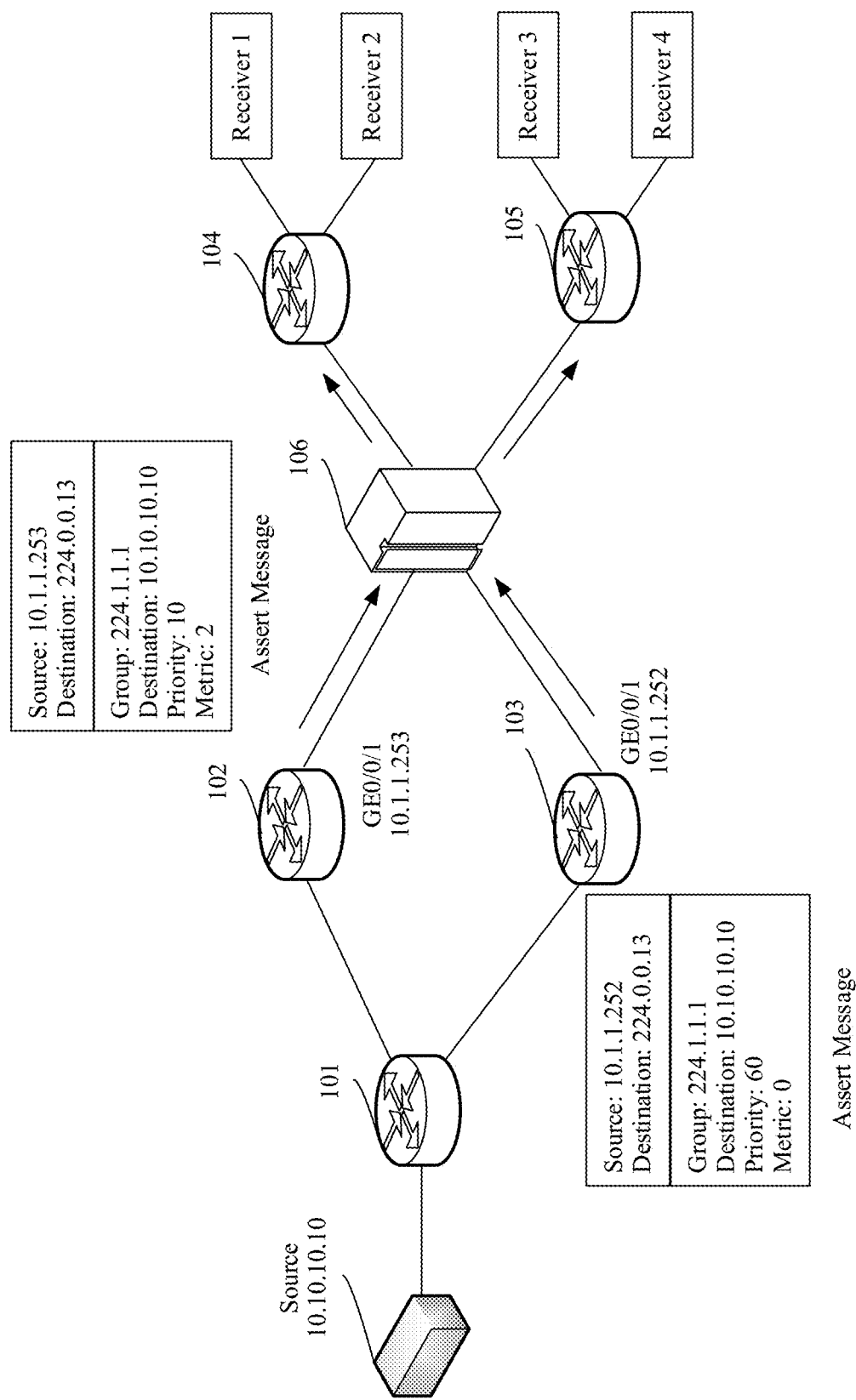
FIG. 1 is a schematic diagram of a scenario in which a multicast packet is sent according to an embodiment of this application.

FIG. 1 is a schematic diagram of an application scenario in which multicast traffic is forwarded. This scenario includes a multicast source, network nodes 101 to 106, and receivers 1 to 4. A node in a multicast network supports a PIM protocol and an internet group management protocol (IGMP). The receivers 1 to 4 may join a multicast group through the IGMP, and the network nodes 101 to 106 may use the PIM protocol to build a multicast distribution tree. The leaf nodes 104 and 105 in the multicast tree may receive multicast packets by using the forwarding node 102, or may receive multicast packets by using the forwarding node 103. The leaf node 104 forwards the received multicast packets to the receivers 1 and 2, and the leaf node 105 forwards the received multicast packets to the receivers 3 and 4.

In the foregoing process of forwarding the multicast packet, the leaf node 104 may join a multicast group G1 by using the upstream forwarding node 102, and the leaf node 105 may join the multicast group G1 by using the forwarding node 103. However, in a shared network, the device 106 may be a Layer 2 switch. In this way, when the forwarding node 102 sends multicast traffic to the downstream device 104 through the device 106, the multicast traffic is transparently transmitted to the forwarding node 103 and the leaf node 105 through the device 106. Consequently, an outbound interface of the forwarding node 103 receives the multicast traffic sent to the downstream device 104, and the multicast traffic is forwarded. In this case, the forwarding node 102 may discard, through a reverse path forwarding (RPF) check, the multicast traffic received from a downstream interface, and the forwarding node 102 is triggered to send an assert packet. The RPF check is used to implement loop-free forwarding of the multicast packet. In other words, an RPF mechanism ensures that the multicast packet is received from a correct interface. The multicast packet that passes the RPF check can be forwarded along the multicast tree. If a data packet is received from an incorrect interface, a network device discards the multicast packet.

As described above, the forwarding node may avoid repeatedly forwarding the same multicast packet by using an assert mechanism. In the scenario shown in FIG. 1, the forwarding node 102 sends an assert message in a multicast mode. In this way, after receiving the assert message, another forwarding node compares a parameter carried in the received assert message with a parameter of a same type of the device. A downstream outbound interface of a winner is selected according to an election rule, for example, priority comparison or metric (cost) comparison, to determine one forwarding path. For a definition of the PIM assert message, refer to related descriptions of the Requirement for Comments (RFC) 7761 disclosed by the Internet Engineering Task Force (IETF), and details are not described in this application again.

However, with wide deployment of multicast service, a large number of assert messages are sent in a short time in the multicast network. This greatly affects the network nodes in the shared network and increases the number of PIM assert messages processed by the network nodes. In addition, the assert messages may be discarded, and a time at which the multicast traffic is repeatedly forwarded in the network is prolonged.

To resolve the foregoing technical problems, this application provides a method, device, and system for sending an assert message. According to this method, content of a plurality of assert messages may be classified based on a same source address or a same RP address by extending formats of the PIM assert messages, and the assert messages with the same source address or the plurality of assert messages with the same RP address are aggregated into one assert message, to increase packet processing efficiency. Especially in the scenario in which the large number of assert messages are triggered for sending, the foregoing method can be used to reduce processing overheads of the device and shorten the time at which the multicast traffic is repeatedly forwarded. The method, network node, and system for sending and obtaining a PIM assert message provided in the embodiments of the present disclosure solves the problems in a similar way. Therefore, mutual reference may be made between embodiments of the network node, the method, and the system, and the same or similar parts are not described herein again.

Figure 2:
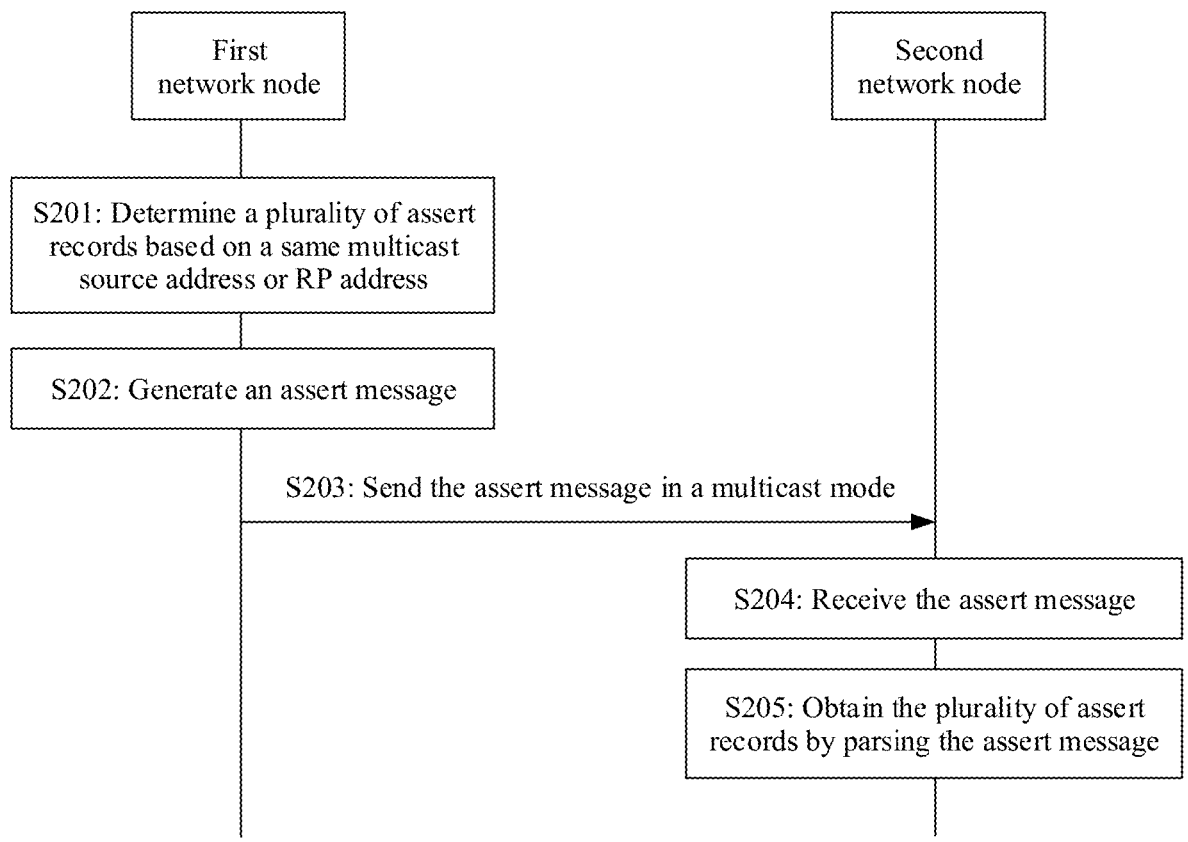
FIG. 2 is a schematic flowchart of a method for sending an assert message according to an embodiment of this application.

With reference to the application scenario shown in FIG. 1, and referring to FIG. 2, an embodiment of the present disclosure provides a method for sending an assert message. The method includes the following steps.

S201: A first network node determines a plurality of assert records based on one multicast source address or one rendezvous point (RP) address.

In an example, the first network node determines the plurality of assert records based on the multicast source address, where each of the plurality of assert records includes the multicast source address and one multicast group address, and multicast group addresses included in different assert records in the plurality of assert records are different from each other. The assert record may be determined by the first network device based on content of a received assert message, or determined based on content of an assert message generated by the first network device and to be sent.

In an example, the first network node determines a first assert record set based on the rendezvous point RP address, where the first assert record set includes a plurality of assert records, each of the plurality of assert records includes one multicast source address and one multicast group address, and each of different assert records in the plurality of assert records includes a first multicast group address.

In an example, the first network node receives multicast traffic, performs an RPF check on a shortest path tree (SPT) by using the multicast source address, and performs an RPF check on a rendezvous point tree (RPT) by using the RP address. When the first network node finds that another node in a same LAN also forwards the same multicast traffic, the first network node is triggered to send an assert message in a multicast mode, where a destination address of the assert message is a permanent group address 224.0.0.13. A condition for triggering the first network node to send the assert message may alternatively be receiving an assert message sent by another network device in a multicast network, and there are many conditions for triggering the first network node to send the assert message. This is not limited in this application.

In an example, each assert record includes one multicast entry or one multicast route of the first network node, and the multicast entry includes a multicast source address and a multicast group address. For example, each assert record includes one multicast route (S, G) or (*, G), where * indicates that the multicast source address is 0. When the first network node is located in the SPT, each assert record includes one multicast entry (S, G). When the first network node is located in the RPT, each assert record includes one multicast entry (S, G) or (*, G). If the (S, G) entry exists in the RPT, the assert record includes (S, G) entry. If the (S, G) entry does not exist in the RPT but the (*, G) entry exists in the RPT, the assert entry includes the (*, G) entry.

In an example, that a first network node determines a plurality of assert records based on one multicast source address includes: The first network node determines the first assert record set based on the multicast source address, where the first assert record set includes a first assert record and a second assert record that have the same multicast source address.

In an example, the first network node determines a second assert record set based on the RP address. The second assert record set includes a plurality of assert records, and each assert record in the second assert record set includes the multicast source address and one multicast group address. Each of different assert records in the plurality of assert records in the second assert record set includes a second multicast group address, the assert message further includes the second multicast group address, and the first multicast group address is different from the second multicast group address.

S202: The first network node generates one assert message.

In an example, the first network node generates the assert message based on the plurality of assert records, where the assert message includes the multicast source address and the multicast group addresses in the plurality of assert records. The first network node may extract the multicast source address, and combine the multicast source address with a multicast group address of the first assert record and a multicast group address of the second assert record to generate the assert message.

In an example, the first network node extracts the RP address and the multicast group addresses of the first assert record set and the second assert record set, and combines the RP address and the multicast group addresses of the first assert record set and the second assert record set with the multicast source addresses of the first assert record set and the second assert record set to generate the assert message.

Figure 3:
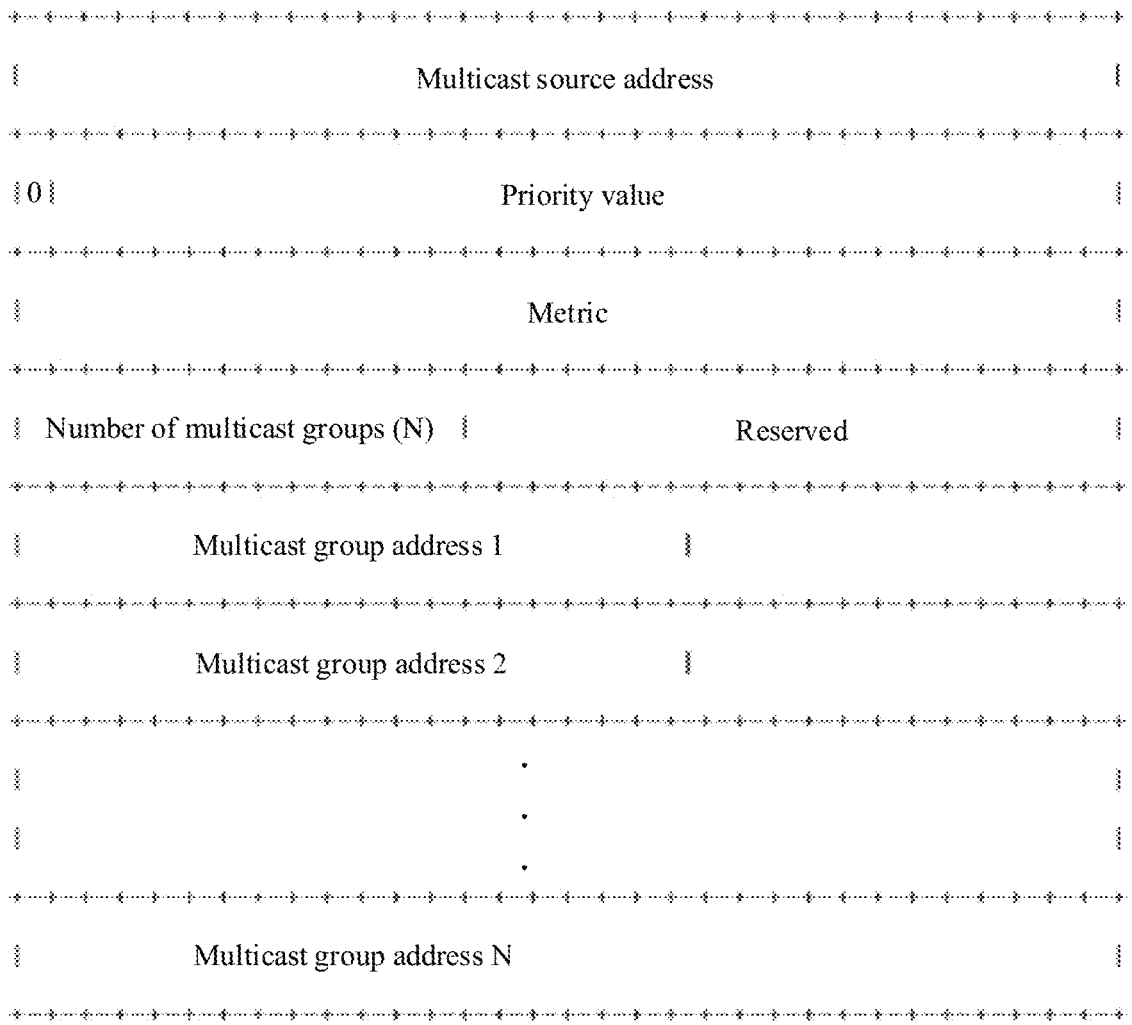
FIG. 3 is a schematic diagram of a packet format of an assert message according to an embodiment of this application.

FIG. 3 shows a format of sending an assert message according to this application. The first network node extracts the same multicast source address of the first assert record and the second assert record, and fills the same multicast source address in a multicast source address shown in FIG. 3. The first network device fills the group address of the first assert record in a multicast group address 1, and fills the group address of the second assert record in a multicast group address 2.

For example, the first network node classifies multicast entries (S, G) in the SPT based on a same multicast source address, and divides the entries into different assert record sets based on the multicast source address, where each assert record set includes more than two assert records that have the same multicast source address. For example, the first assert record set includes a plurality of assert records (S1, G1) and (S1, G2) that have a same source address S1. The first network node fills S1 in the "multicast source address" part shown in FIG. 3, fills G1 in the "multicast group address 1" part, and fills G2 in the "multicast group address 2" part.

In an example, the first network node determines the first assert record set based on the same RP address, where the first assert record set includes a first assert sub-record set and a second assert sub-record set that have a same multicast group address. The first assert sub-record set includes a third assert record and a fourth assert record that have a same multicast group address, and the second assert sub-record set includes a fifth assert record and a sixth assert record that have a same multicast group address.

Figure 4:
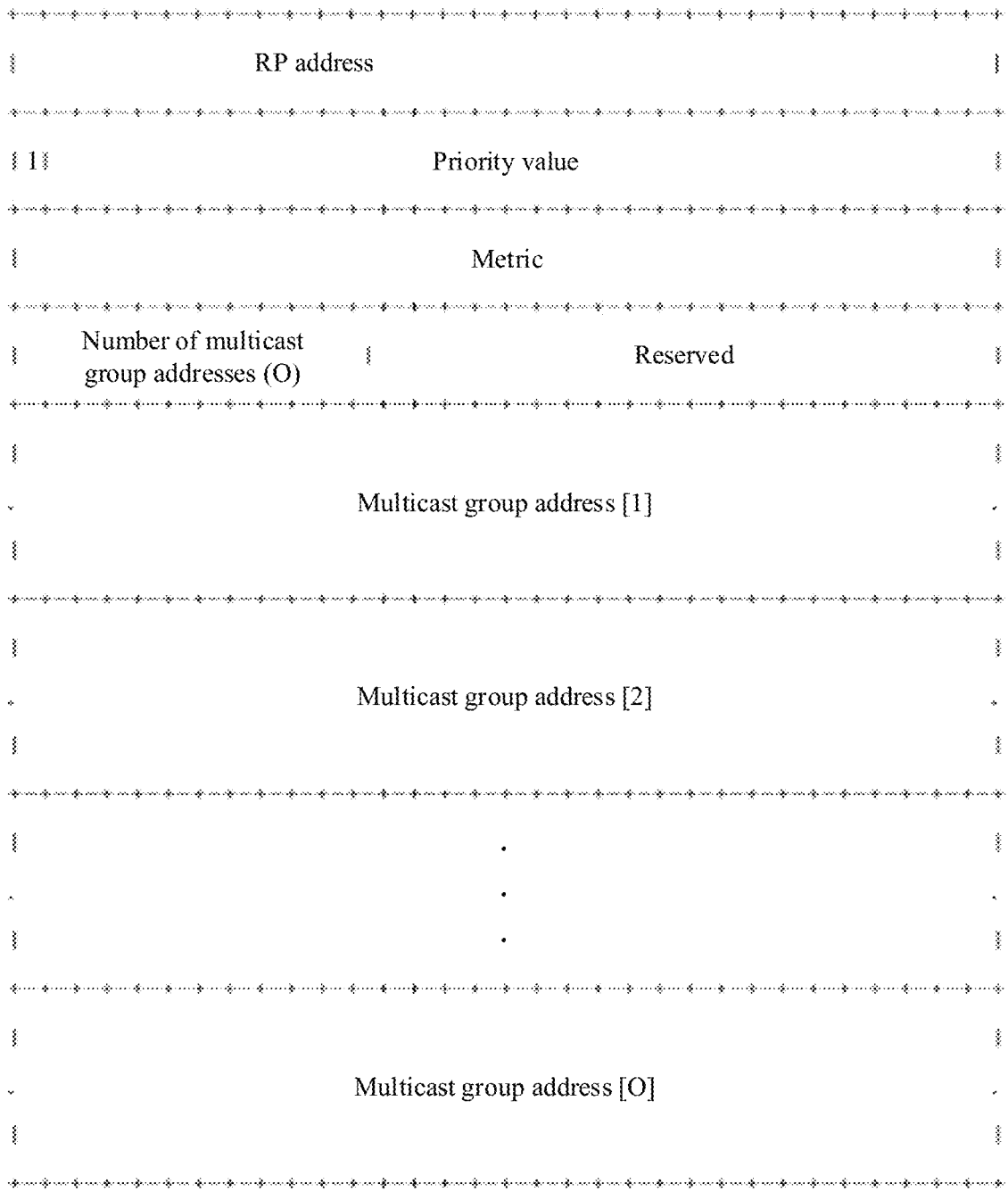
FIG. 4 is a schematic diagram of another packet format of an assert message according to an embodiment of this application.

For example, FIG. 4 shows another format of sending an assert message according to this application. The first network node extracts the same RP address of the first assert sub-record set and the second assert sub-record set, and fills the same RP address in an "RP address" part shown in FIG. 4. The first network device fills the same multicast group address of the first assert sub-record set in a multicast group address 1 part, and fills the same multicast group address of the second assert sub-record set in a multicast group address 2 part.

Figure 5:
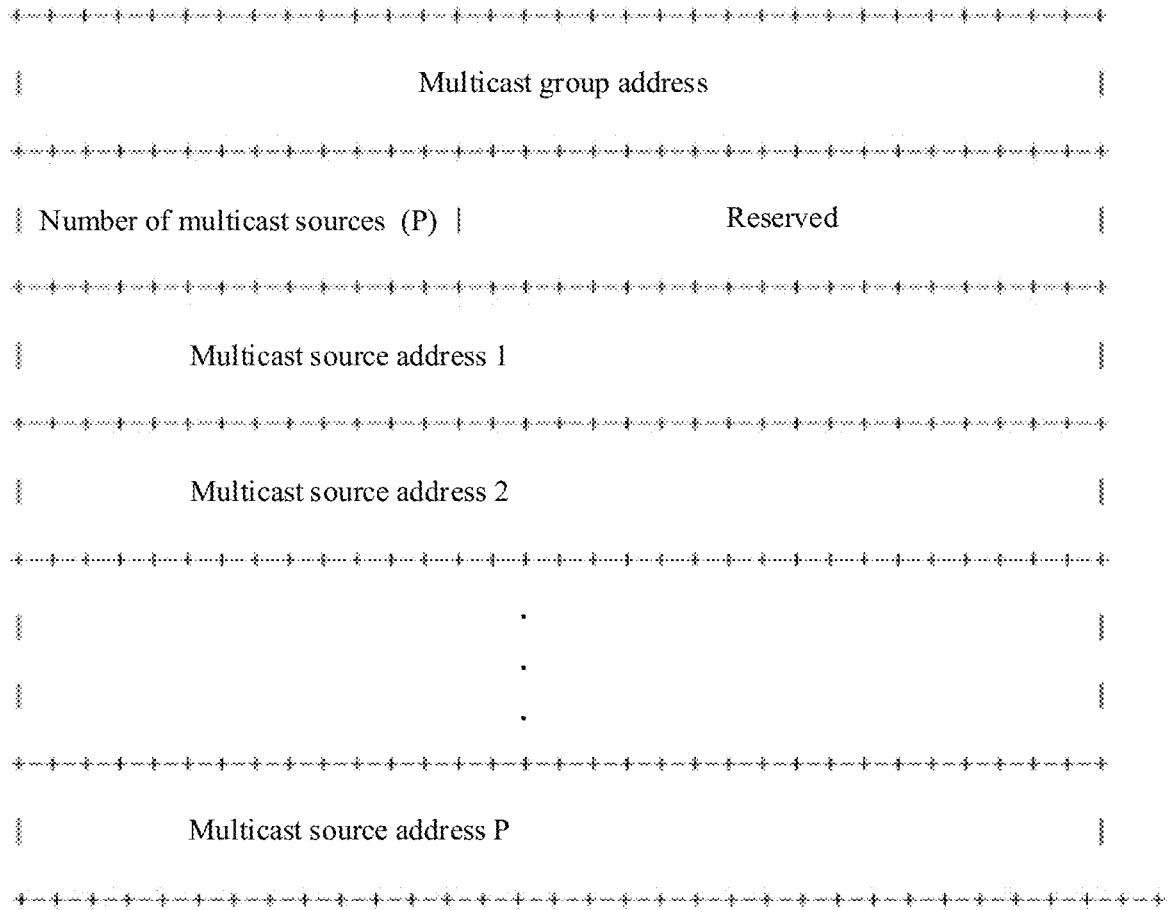
FIG. 5 is a schematic diagram of still another packet format of an assert message according to an embodiment of this application.
Figure 6:
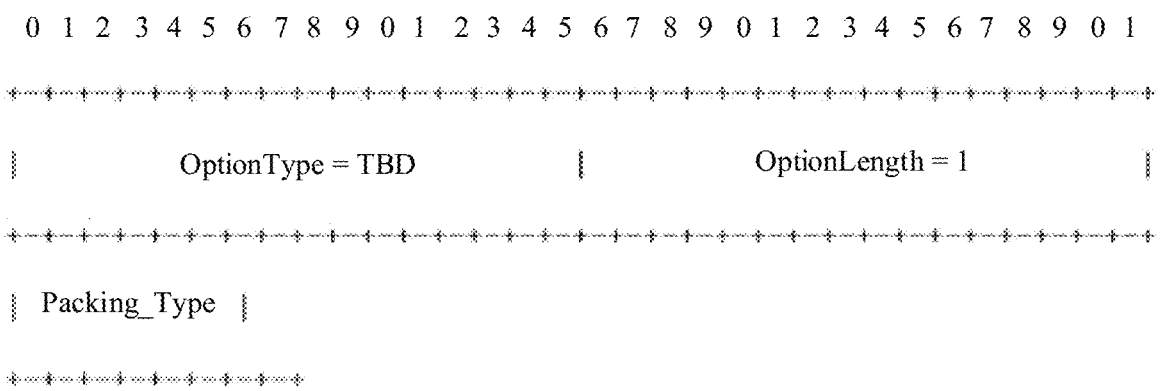
FIG. 6 is a schematic diagram of a format of a PIM Hello packet according to an embodiment of this application.

FIG. 5 shows a format of a "multicast group address" part in FIG. 4 according to this application. The "multicast group address" may be a same multicast group address extracted from the plurality of assert records. For example, the first assert sub-record set includes the third assert record and the fourth assert record that have the same multicast group address. The second assert sub-record set includes the fifth assert record and the sixth assert record that have the same multicast group address. The network node may extract the same multicast group address of the third assert record and the fourth assert record, and fill the same multicast group address in a "multicast group address" part shown in FIG. 5. The network node fills a multicast source address of the third assert record in a "multicast source address 1" part, and fills a multicast source address of the fourth assert record in a "multicast source address 2" part. Each of the third record, the fourth record, the fifth record, and the sixth record may include an (S, G) entry or a (*, G) entry.

For example, the first network node classifies routing entries in the RPT based on a same RP address, and divides the entries into different assert record sets based on the RP address. Each assert record set includes more than two assert sub-record sets with the same RP address, each assert sub-record set includes a plurality of assert records, and the plurality of assert records have a same multicast group address.

In an example, before the first network node sends an assert packet, the method further includes: The first network node receives a PIM Hello packet sent by another network node in the multicast network, where the Hello packet carries a first identifier, and the first identifier is used to negotiate and support a packet format of aggregating the plurality of assert records into one assert message.

In an example, a Hello packet is externally sent on each PIM-enabled interface of the network node. The Hello packet is used to discover a PIM neighbor, adjust PIM protocol packet parameters, and maintain a neighbor relation. A destination address of the Hello packet is 224.0.0.13 (indicating all PIM network nodes in a same network segment).

In an example, the Hello packet includes an identifier used to negotiate and support aggregation of the assert message. FIG. 5 shows a Hello packet that carries the identifier according to this application. An "OptionType" may be used to indicate that the assert message is a packet obtained by aggregating a plurality of assert records, and a "Packing_Type" may be used to indicate a specific method for packing the assert records. Different packing methods are identified by using different values.

In an example, the assert message may further carry second and third identifiers. The second identifier is used to indicate the number of multicast group addresses carried in the assert message, and the third identifier is used to indicate the number of multicast source addresses carried in the assert message. As shown in FIG. 3, an identifier N in the number (N) of multicast group addresses in the assert message indicates that the number of multicast group addresses carried in the assert message is N, and may further indicate the number of aggregated assert records. As shown in FIG. 4, an identifier O in the number (O) of multicast group addresses in the assert message indicates that the number of multicast group addresses carried in the assert message is O. As shown in FIG. 5, an identifier P in the number (P) of multicast source addresses in the assert message indicates that the number of multicast source addresses carried in the assert message is P.

In an example, the assert message further includes parameter information, where the parameter information may include a metric (cost) of a unicast route to a multicast source, a protocol priority of the unicast route to the multicast source, and the like.

S203: The first network node sends the assert message in the multicast mode.

In an example, the first network node sends the aggregated assert message to the another network node in the multicast network in the multicast mode. A format of the assert message may be the format shown in FIG. 3 or FIG. 4.

In an example, the assert message may carry more than two different assert record sets, for example, the first assert record set and the second assert record set. The first assert record set may have a same first multicast source address, and the second assert record set may have a same second multicast source address, where the first multicast source address is different from the second multicast source address.

In an example, the assert message carries more than two different assert record sets, for example, the first assert record set and the second assert record set. The first assert record set may have a same first RP address, and the second assert record set may have a same second RP address, where the first RP address is different from the second RP address.

S204: A second network node receives the assert message sent by the first network node.

In an example, the second network node receives the assert message, where the assert message may include the multicast source address and the plurality of corresponding multicast group addresses. The assert message may alternatively include the RP address and the first assert record set, where the first assert record set includes the first multicast group address and the plurality of multicast source addresses.

S205: The second network node obtains the plurality of assert records by parsing the assert message.

In an example, the first network node obtains the plurality of assert records by parsing the assert message, where each of the plurality of assert records includes the multicast source address and one of the plurality of multicast group addresses, and the multicast group addresses in the plurality of assert records are different from each other. The first network node may obtain the plurality of assert records by combining the multicast source address and the plurality of multicast group addresses that are carried in the assert message.

In an example, the first network node obtains the plurality of assert records by parsing the first assert record set, where each of the plurality of assert records includes one multicast source address and one multicast group address, and each of different assert records in the plurality of assert records includes a first multicast group address.

In an example, the first network node obtains the plurality of assert records by parsing the second assert record set, where each of different assert records in the second assert record set include a second multicast group address, and the first multicast group address is different from the second multicast group address.

For example, the second network node receives the assert message shown in FIG. 3, and combines the "multicast source address" part with the "multicast group address 1" part, the "multicast group address 2" part, . . . , and a "multicast group address N" part, to obtain multicast entries such as (multicast source address, multicast group address 1) and (multicast source address, multicast group address 2) of the plurality of assert records.

In an example, the second network node determines that the assert message carries the first assert record set, where the assert record set includes the RP address and the plurality of multicast group addresses. As shown in FIG. 4, the assert message carries one "RP address" and a plurality of "multicast group addresses". As shown in FIG. 5, each "multicast group address" corresponds to a plurality of source addresses, such as the "multicast source address 1" and the "multicast source address 2". The second network node combines each multicast group address, for example, the multicast group address 1, with corresponding source addresses such as the "multicast source address 1" and the "multicast source address 2", to obtain multicast entries (multicast group address 1, multicast source address 1) and (multicast group address 1, multicast source address 2) of the plurality of assert records.

In an example, the second network node may further obtain the parameter information of the first network device from the assert message, for example, parameters such as the metric (cost) of the unicast route from the first network device to the multicast source and the protocol priority of the unicast route from the first network device to the multicast source. The second network node performs assert election based on the obtained information and parameters carried by the second network node. For example, a specific election rule may be that a unicast route with a relatively high protocol priority to the multicast source wins. If unicast routes have a same priority, a unicast route with relatively small overheads and to the multicast source wins. If protocol priorities and metrics are the same, a unicast route with largest IP address of an interface wins. A specific rule may be set based on a requirement, and the election rule is not limited herein.

Figure 7:
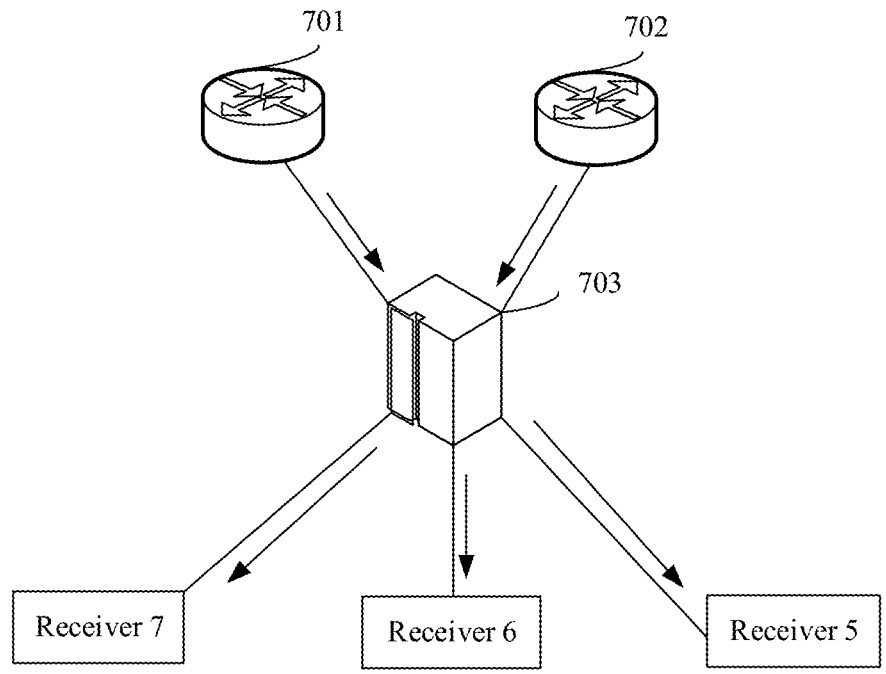
FIG. 7 is a schematic diagram of a scenario in which an assert message is forwarded according to an embodiment of this application.

The foregoing method may further be applicable to a designated router (DR) election scenario. For example, as shown in FIG. 7, upstream network nodes 701 and 702 are connected to downstream receivers 5 to 7 over a shared network, and the receivers 5 and 6 send internet group management protocol (IGMP) report packets or multicast listener discovery (MLD) report packets to join the network nodes 701 and 702. A network node 703 is a Layer 2 switching device. In this scenario, the network node 703 may alternatively be a Layer 2 switching device in the Layer 2 Ethernet. According to section 4.3 in RFC 7761, DR election occurs between the network nodes 701 and 702. Only a DR can forward multicast traffic to each of the receivers 5 to 7 in the network. For example, the network node 701 is elected as the DR. After the network node 701 is faulty, the network node 702 forwards the multicast traffic.

In a recovery process of the network node 701, the network node 701 starts to forward the multicast traffic, but the network node 702 does not stop forwarding the multicast traffic. In this case, an assert election may also occur between the network node 701 and the network node 702, the network node 701 is triggered to send an assert message to the network node 702, and the network node 702 is triggered to send an assert message to the network node 701. When there are more than two multicast traffic forwarding nodes in this scenario, the network node needs to send and receive a large number of assert messages. In this case, the network node that sends the assert messages may send an aggregated assert message by using the method steps shown in FIG. 2, to increase packet sending efficiency and reduce network overheads. For example, the network node 701 is the first network node in the multicast network in FIG. 2, and the network node 702 is the second network node in FIG. 2. Alternatively, the network node 702 is the first network node in the multicast network in FIG. 2, and the network node 701 is the second network node in FIG. 2 and performs a related operation. For a specific manner of sending and obtaining the assert message, refer to the embodiment shown in FIG. 2, and details are not described herein again.

According to the foregoing method, the PIM assert message is extended, so that a plurality of assert messages are classified based on a same source address and different group addresses or a same RP address and different group addresses, and assert messages of a same type are aggregated into one assert message, to increase packet processing efficiency. Especially in a scenario in which a large number of assert messages are triggered for sending, the foregoing method can be used to reduce processing overheads of the device and increase the packet processing efficiency.

Figure 8:
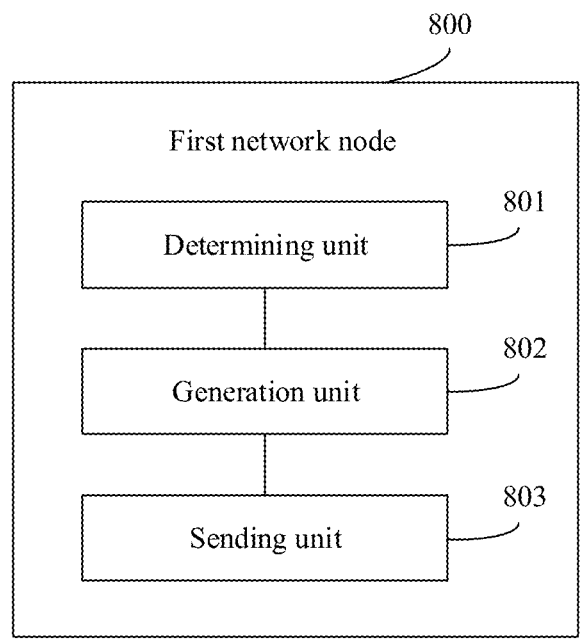
FIG. 8 is a schematic structural diagram of a first network device for sending an assert message according to an embodiment of this application.

FIG. 8 shows a network node for sending an assert message in the foregoing embodiments. For example, FIG. 8 is a possible schematic structural diagram of a first network node. The first network node 800 may implement functions of the first network node in the embodiment in FIG. 2. Referring to FIG. 8, the first network node 800 includes a determining unit 801, a generation unit 802, and a sending unit 803. These units may perform the corresponding functions of the first network node in the foregoing method embodiment. The determining unit 801 is configured to support the first network node 800 in performing the process S201 in FIG. 2. The generation unit 802 is configured to support the first network node 800 in performing the process S202 in FIG. 2. The sending unit 803 is configured to support the first network node 800 in performing the process S203 in FIG. 2. For example, the determining unit 801 is configured to determine various types of information performed by the first network node in the foregoing method embodiment. The generation unit 802 is configured to generate the various types of information performed by the first network node in the foregoing method embodiment. The sending unit 803 is configured to send the various types of information performed by the first network node in the foregoing method embodiment. For example, the determining unit 801 is configured to determine a plurality of assert records based on one multicast source address or one rendezvous point (RP) address. The generation unit 802 is configured to generate one assert message. The sending unit 803 is configured to send the assert message in a multicast mode. For a specific execution process, refer to the detailed descriptions of the corresponding steps in the foregoing embodiment shown in FIG. 2. Details are not described herein again.

Figure 9:
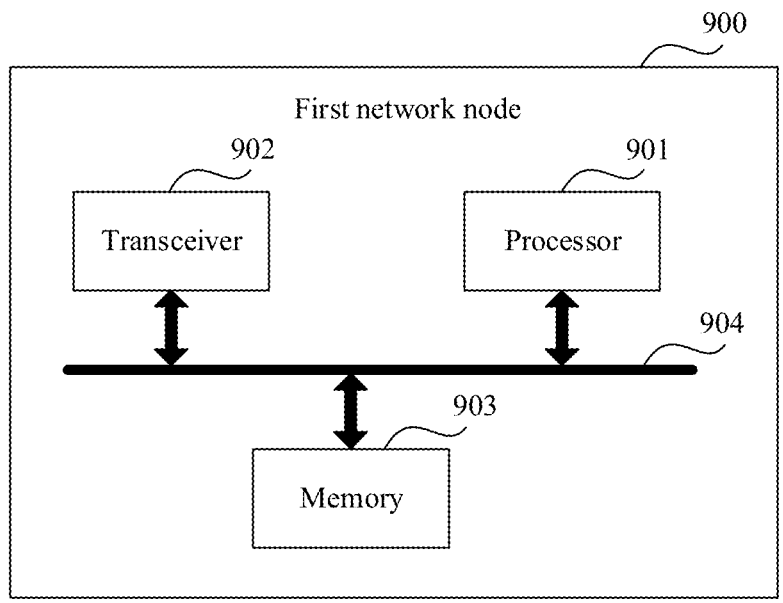
FIG. 9 is a schematic structural diagram of another first network device for sending an assert message according to an embodiment of this application.

FIG. 9 is a schematic structural diagram of a first network node 900 for sending an assert message. For example, the first network device 900 includes a processor 901 and a transceiver 902, and may further include a memory 903 and a bus 904. The processor 901, the transceiver 902, and the memory 903 are connected to each other through the bus 904. The bus 904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus. The first network device 900 may implement functions of the first network device in the embodiment shown in FIG. 2. The processor 901 and the transceiver 902 may execute corresponding functions of the first network device in the foregoing method embodiment. The transceiver 902 is configured to support the first network device 900 in performing the process S203 in FIG. 2 and/or another process performed by the first network device in the technology described in this specification. The processor 901 is configured to support the first network device 900 in performing the processes S201 and S202 in FIG. 2 and/or another process performed by the first network device in the technology described in this specification. The memory 903 is configured to store program code and data of the first network device 900. For a specific execution process, refer to the detailed descriptions of the corresponding steps in the foregoing embodiment shown in FIG. 2. Details are not described herein again. The first network device 900 may be a router, a switch, or a network device having a forwarding function, and the network device 900 can implement the functions of the first network device in the foregoing method embodiment.

Figure 10:
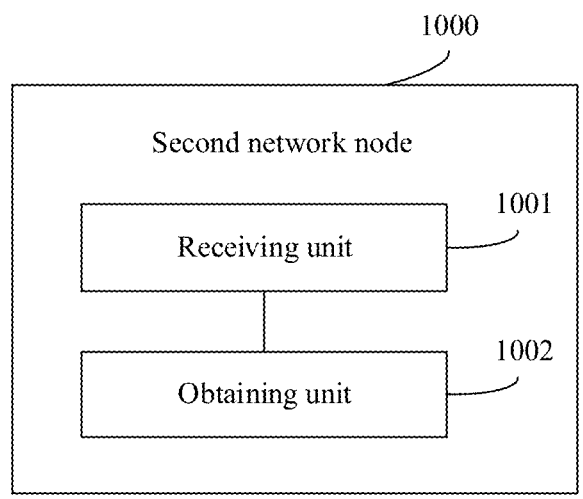
FIG. 10 is a schematic structural diagram of a second network device for obtaining an assert message according to an embodiment of this application.

FIG. 10 is a schematic structural diagram of a network node for obtaining an assert message in the foregoing embodiments. For example, FIG. 10 is a possible schematic structural diagram of a second network node 1000. The second network node 1000 may implement functions of the second network node in the embodiment shown in FIG. 2. Referring to FIG. 10, the second network node 1000 includes a receiving unit 1001 and an obtaining unit 1002. These units may perform the corresponding functions of the second network node in the foregoing method embodiment. The receiving unit 1001 is configured to support the second network node 1000 in performing the process S204 in FIG. 2. The obtaining unit 1002 is configured to support the second network node 1000 in performing the process S205 in FIG. 2. For example, the receiving unit 1001 is configured to receive various types of information performed by the second network node in the foregoing method embodiment. The obtaining unit 1002 is configured to obtain the various types of information performed by the second network node in the foregoing method embodiment. For example, the receiving unit 1001 is configured to receive an assert message sent by another network node in a multicast network. The obtaining unit 1002 is configured to obtain a plurality of assert records by parsing the assert message. For a specific execution process, refer to the detailed descriptions of the corresponding steps in the foregoing embodiment shown in FIG. 2. Details are not described herein again.

Figure 11:
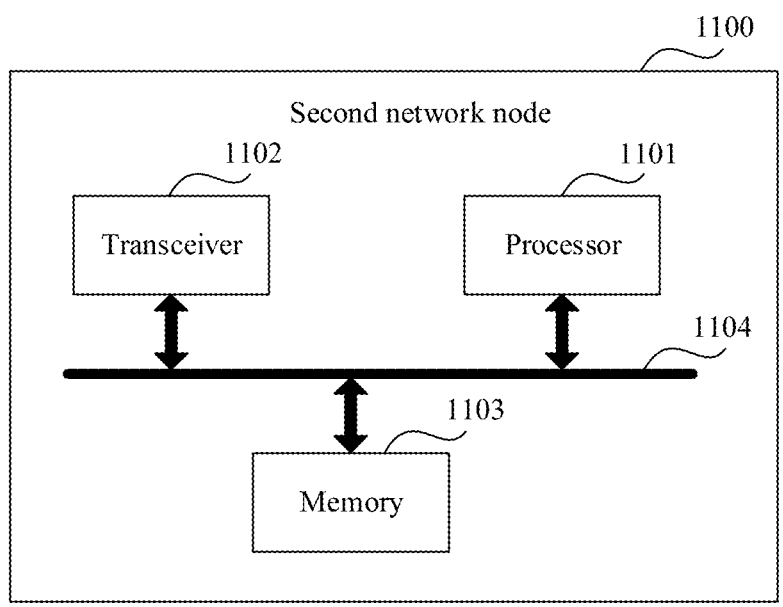
FIG. 11 is a schematic structural diagram of another second network device for obtaining an assert message according to an embodiment of this application.

FIG. 11 is a schematic structural diagram of a second network node 1100 for obtaining an assert message. For example, the second network device 1100 includes a processor 1101 and a transceiver 1102, and may further include a memory 1103 and a bus 1104. The processor 1101, the transceiver 1102, and the memory 1103 are connected to each other through the bus 1104. The bus 1104 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 11, but this does not mean that there is only one bus or only one type of bus. The second network device 1100 may implement functions of the second network device in the embodiment shown in FIG. 2. The processor 1101 and the transceiver 1102 may perform corresponding functions of the second network device in the foregoing method embodiment. The transceiver 1102 is configured to support the second network device 1100 in performing the process S204 in FIG. 2 and/or another process performed by the second network device in the technology described in this specification. The processor 1101 is configured to support the second network device 1100 in performing the process S205 in FIG. 2 and/or another process performed by the second network device in the technology described in this specification. The memory 1103 is configured to store program code and data of the second network device 1100. For a specific execution process, refer to the detailed descriptions of the corresponding steps in the foregoing embodiment shown in FIG. 2. Details are not described herein again. The second network device 1100 may be a router, a switch, or a network device having a forwarding function, and the second network device 1100 can implement the functions of the first network device in the foregoing method embodiment.

Figure 12:
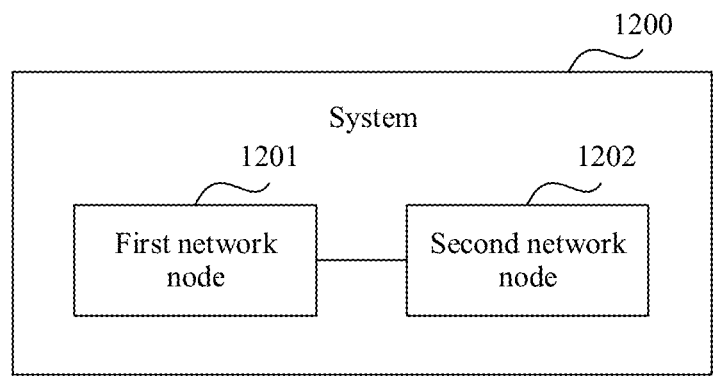
FIG. 12 is a schematic structural diagram of a system for sending and obtaining an assert message according to an embodiment of this application.

FIG. 12 is a schematic structural diagram of a system 1200 for sending and obtaining an assert message. The system 1200 is configured to implement the method for sending and obtaining an assert packet in the foregoing method embodiment. The system 1200 includes a first network node 1201 and a second network node 1202. The first network node 1201 and the second network node 1202 may respectively implement functions of the first network node and the second network node in the embodiment shown in FIG. 2. For example, the first network node 1201 performs the processes S201 to S203 in FIG. 2 and/or another process performed by the first network device in the technology described in this specification. The second network node 1202 performs the processes S204 and S203 in FIG. 2, and/or is configured to perform another process performed by the second network device in the technology described in this specification. The first network node 1201 determines a plurality of assert records based on one multicast source address or one RP address, generates one assert message, and sends the assert message in a multicast mode. The second network node 1202 is configured to receive the assert message sent by the first network node 1201, and obtain the plurality of assert records by parsing the assert message.

In an example, the system 1200 further includes a third network node. The first network node may send the generated assert message to the third network node.

An embodiment of the present disclosure further provides a storage medium, configured to store a software instruction used in the foregoing embodiments. The storage medium includes a program used to perform the method shown in the foregoing embodiments. When the program is executed on a computer or a device, the computer or the device is enabled to perform the method in the foregoing method embodiment.

"First" in the first network device in the embodiments of the present disclosure is merely used as a name identifier, and does not represent the first in sequence. For the words "second" and "third", this rule also applies.

It should be noted that any apparatus embodiment described above is merely an example. The units described as separate parts may or may not be physically separate, and parts displayed as units may or may not be physical units, may be located in one position, or may be distributed on a plurality of network units. Some or all the modules may be selected based on actual requirements to achieve the objectives of the solutions of the embodiments. In addition, in the accompanying drawings of the embodiments of the first network device or the controller provided by the present disclosure, connection relationships between modules indicate that the modules have communication connections with each other, and the communication connection may be specifically implemented as one or more communications buses or signal lines. A person of ordinary skill in the art may understand and implement the embodiments of the present disclosure without creative efforts.

Methods or algorithm steps described in combination with the content disclosed in the embodiments of the present disclosure may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a hard disk, a removable hard disk, a compact disc, or any other form of storage medium well-known in the art. For example, a storage medium is coupled to a processor, so that the processor can read information from the storage medium or write information into the storage medium. Certainly, the storage medium may alternatively be a component of the processor. The processor and the storage medium may also be located in an ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any available medium accessible to a general-purpose or special-purpose computer.

In the foregoing specific implementations, the objectives, technical solutions, and benefits of the present disclosure are further described in detail. It should be understood that the foregoing descriptions are merely specific embodiments of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A method for sending an assert message in a multicast network, comprising:
   determining, by a network node, a plurality of assert records based on one multicast source address, wherein each of the plurality of assert records comprises the multicast source address and one multicast group address, and multicast group addresses comprised in different assert records in the plurality of assert records are different from each other, wherein the plurality of assert records include a first assert record and a second assert record in a first assert record set and wherein the first assert record and the second assert record have same multicast source address;
   generating, by the network node, one assert message based on the plurality of assert records, wherein the assert message comprises the multicast source address and the multicast group addresses in the plurality of assert records; and
   sending, by the network node, the assert message in a multicast mode.

2. The method according to claim 1, wherein the generating, by the network node, one assert message based on the plurality of assert records comprises:
   extracting, by the network node, the multicast source address; and
   combining the multicast source address with a multicast group address of the first assert record and a multicast group address of the second assert record to generate the assert message.

3. The method according to claim 1, further comprising:
   before the sending, by the network node, the assert message in the multicast mode, receiving, by the network node, a Hello packet sent by another network node in the multicast network, wherein the Hello packet carries a first identifier, and the first identifier is used to indicate that the another network node in the multicast network supports a function of receiving the assert message.

4. The method according to claim 1, wherein the assert message carries a number of multicast group addresses.

5. A method for sending an assert message in a multicast network, comprising:
   determining, by a network node, a first assert record set based on one rendezvous point (RP) address, wherein the first assert record set comprises a plurality of assert records, each of the plurality of assert records comprises one multicast source address and one multicast group address, and each of the plurality of assert records comprises a first multicast group address;
   determining, by the network node, a second assert record set based on the RP address, wherein the second assert record set comprises a plurality of assert records, each assert record in the second assert record set comprises one multicast source address and one multicast group address, each of the plurality of assert records in the second assert record set comprises a second multicast group address, the assert message further comprises the second multicast group address, and the first multicast group address is different from the second multicast group address;
   generating, by the network node, one assert message, wherein the assert message carries the RP address, the first multicast group address, and a plurality of multicast source addresses; and
   sending, by the network node, the assert message in a multicast mode.

6. The method according to claim 5, wherein the generating, by the network node, one assert message comprises:
   extracting, by the network node, the RP address and the multicast group addresses of the first assert record set and the second assert record set; and combining the RP address and the multicast group addresses of the first assert record set and the second assert record set with the multicast source addresses of the first assert record set and the second assert record set to generate the assert message.

7. The method according to claim 5, further comprising: before the sending, by the network node, the assert message in the multicast mode, receiving, by the network node, a Hello packet sent by another network node in the multicast network, wherein the Hello packet carries a first identifier, and the first identifier is used to indicate that the another network node in the multicast network supports a function of receiving the assert message.

8. The method according to claim 5, wherein the assert message carries a number of multicast group addresses and a number of multicast source addresses.

9. A device for sending an assert message, comprising:
a processor; and
a non-transitory computer-readable storage medium coupled to the processor and storing programming instructions for execution by the processor, wherein the processor executes the programming instructions to cause the device to:
determine a plurality of assert records based on one multicast source address, wherein each of the plurality of assert records comprises the multicast source address and one multicast group address, and multicast group addresses comprised in different assert records in the plurality of assert records are different from each other, wherein the plurality of assert records include a first assert record and a second assert record in a first assert record set, and wherein the first assert record and the second assert record have same multicast source address;
generate one assert message based on the plurality of assert records, wherein the assert message comprises the multicast source address and the multicast group addresses in the plurality of assert records; and
send the assert message in a multicast mode.

10. The device according to claim 9, wherein the processor further executes the programming instructions to cause the device to extract the multicast source address, and combine the multicast source address with a multicast group address of the first assert record and a multicast group address of the second assert record to generate the assert message.

11. The device according to claim 9, wherein the processor further executes the programming instructions to cause the device to receive a Hello packet sent by another network node in the multicast network, wherein the Hello packet carries a first identifier, and the first identifier is used to indicate that the another network node in the multicast network supports a function of receiving the assert message.

12. The device according to claim 9, wherein the assert message carries a number of multicast group addresses.

13. A device for sending an assert message in a multicast network, comprising:
a processor; and
a non-transitory computer-readable storage medium coupled to the processor and storing programming instructions for execution by the processor, wherein the processor executes the programming instructions to cause the device to:
determine a first assert record set based on one rendezvous point (RP) address, wherein the first assert record set comprises a plurality of assert records, each of the plurality of assert records comprises one multicast source address and one multicast group address, and each of the plurality of assert records comprises a first multicast group address;
determine a second assert record set based on the RP address, wherein the second assert record set comprises a plurality of assert records, each assert record in the second assert record set comprises one multicast source address and one multicast group address, each of the plurality of assert records in the second assert record set comprises a second multicast group address, and wherein the assert message further comprises the second multicast group address, and the first multicast group address is different from the second multicast group address;
generate one assert message, wherein the assert message carries the RP address, the first multicast group address, and a plurality of multicast source addresses; and
send the assert message in a multicast mode.

14. The device according to claim 13, wherein the processor further executes the programming instructions to cause the device to extract the RP address and the multicast group addresses of the first assert record set and the second assert record set, and combine the RP address and the multicast group addresses of the first assert record set and the second assert record set with the multicast source addresses of the first assert record set and the second assert record set to generate the assert message.

15. The device according to claim 13, wherein the processor further executes the programming instructions to cause the device to receive a Hello packet sent by another network node in the multicast network, wherein the Hello packet carries a first identifier, and the first identifier is used to indicate that the another network node in the multicast network supports a function of receiving the assert message.

16. The device according to claim 13, wherein the assert message carries a number of multicast group addresses and a number of multicast source addresses.

* * * * *